United States Patent
Vasudevan et al.

(10) Patent No.: US 7,219,103 B2
(45) Date of Patent: May 15, 2007

(54) SYSTEM AND METHOD FOR DATA REPLICATION IN A COMPUTER SYSTEM

(75) Inventors: Bharath Vasudevan, Austin, TX (US); Victor Mashayekhi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 198 days.

(21) Appl. No.: 09/934,386

(22) Filed: Aug. 21, 2001

(65) Prior Publication Data

US 2003/0041074 A1 Feb. 27, 2003

(51) Int. Cl.
*G06F 17/00* (2006.01)

(52) U.S. Cl. .................. 707/102; 707/100; 707/200

(58) Field of Classification Search ............... 707/1–3, 707/8, 10, 200, 202, 203, 204
See application file for complete search history.

(56) References Cited

U.S. PATENT DOCUMENTS

| | | | |
|---|---|---|---|
| 5,781,908 A * | 7/1998 | Williams et al. ............ 709/223 |
| 5,937,414 A | 8/1999 | Souder et al. .............. 707/203 |
| 6,049,809 A | 4/2000 | Raman et al. .............. 707/203 |
| 6,189,017 B1 | 2/2001 | Ronstrom et al. .......... 707/204 |
| 6,438,594 B1 * | 8/2002 | Bowman-Amuah ......... 709/225 |
| 6,446,089 B1 * | 9/2002 | Brodersen et al. .......... 707/201 |
| 2001/0049717 A1 * | 12/2001 | Freeman et al. ............ 709/203 |
| 2002/0065879 A1 * | 5/2002 | Ambrose et al. ........... 709/203 |
| 2003/0204597 A1 * | 10/2003 | Arakawa et al. ............ 709/226 |

OTHER PUBLICATIONS

U.S. Appl. No. 09/927, 047, filed Aug. 06, 2001, Hsieh et al.

* cited by examiner

*Primary Examiner*—Alford W. Kindred
(74) *Attorney, Agent, or Firm*—Baker Botts L.L.P.

(57) ABSTRACT

A system and method for replicating data in a computer system is disclosed. In one embodiment, data replication between a source subsystem and a target subsystem may be selectively changed between synchronous data transfer and asynchronous data transfer based on the occurrence of selected conditions. In another embodiment, a repository subsystem allows write statements to be queued during the time that the target subsystem is unable to replicate data from the source subsystem.

22 Claims, 8 Drawing Sheets

SYSTEM AND METHOD FOR DATA REPLICATION IN A COMPUTER SYSTEM

TECHNICAL FIELD

The present disclosure relates generally to the field of computer systems and, more specifically, to a system and method for operating a cluster to preserve data in the event of an operational loss to a member server of the cluster.

BACKGROUND

A cluster is a group of resources consisting of individual servers, storage and network providing highly-available and scalable computing services to clients, managed through software as a single system. One example of a cluster server is a group of two physical servers coupled to one another through a shared cable for the purpose of internode communications. The management of several servers as a single unit improves the availability, manageability, and scalability of the group of servers. In terms of availability, implementing servers as a cluster improves the availability of services or applications by providing a failure mechanism to insure that applications and services continue to operate despite a hardware, operating system, service, or application failure.

Many clustering solutions rely on a "shared" storage model for storing the data and meta-data for the server cluster. The shared storage cluster approach requires that the cluster servers and their storage be co-located. There is a single copy of data and meta-data in a centralized location, accessible to all member servers. The shared storage cluster is susceptible to failures resulting from natural disasters, power outages, and similar events that might affect a single geographic site. In contrast to the shared storage mode, the "stretched" cluster model allows for geographically separated member nodes of a cluster to exist. In a stretch cluster, there are multiple copies of the data and meta-data, one for each site. Accordingly, each server has its own replicating or mirroring storage system. Because the cluster servers may be dispersed to geographically distant locations, the stretched cluster model provides for a disaster tolerant cluster configuration.

The two most common methods for replicating or mirroring data between the nodes of the stretched server cluster are synchronous data replication and asynchronous data replication. In synchronous data replication, when an application performs a write to the storage at its local site, the operation is affected to the copies of the data in all the sites at the same time, or not at all. Therefore, the data remains consistent from one write operation to the next, across the cluster. Generally, synchronous data replication introduces a significant performance overhead, but maintains data integrity. In asynchronous data replication, when an application performs a write to the storage at is local site, that operation is written in the local site first, and eventually affected to the copies of the data in the other sites. Therefore, while data might be inconsistent from one write operation to the next, the local site will have the most up-to-date copy of the data at all times. Asynchronous data replication has better performance characteristics than synchronous data replication, but exposes the cluster to the possibility of data loss.

SUMMARY

In accordance with teachings of the present disclosure, a system and method for data replication in a computer system is disclosed. According to an embodiment of the present disclosure, the replication scheme includes a source node subsystem, a target node subsystem, wherein the source node and target node each include a cluster member node and storage, and a third subsystem, a repository subsystem. This repository subsystem consists of a node, or multiple nodes residing on a network shared by both the source and target servers. The repository subsystem is able to queue write statements issued from the source node. The target subsystem may pull the queued write statements from the repository subsystem in order to allow the target subsystem to replicate the data from the source subsystem. Alternatively, the repository subsystem may queue the write statement when the target subsystem in unable to handle the write statement. According to another embodiment of the present disclosure, the computer system is able to selectively switch between asynchronous data replication and synchronous data replication.

A technical advantage of the present disclosure is that if the source node fails during data replication, data may still be maintained in the repository subsystem. As a result, the risk of data loss is minimized because the data and meta-data may be recovered from the repository subsystem. Thus, the computer system may continue to employ asynchronous data replication without the risk that data changes are not actually being made to computer system storage. Another technical advantage is that the computer system may selectively change between asynchronous and synchronous data replication. This allows the computer system to balance between minimizing the risk of data loss and performance. Because of the safeguards provided by the present disclosure, the computer system may use asynchronous data replication as the default mode for data replication and still provide for protection against data loss in the event a node fails.

Other technical advantages will be apparent to those of ordinary skill in the art.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

Figure 1:
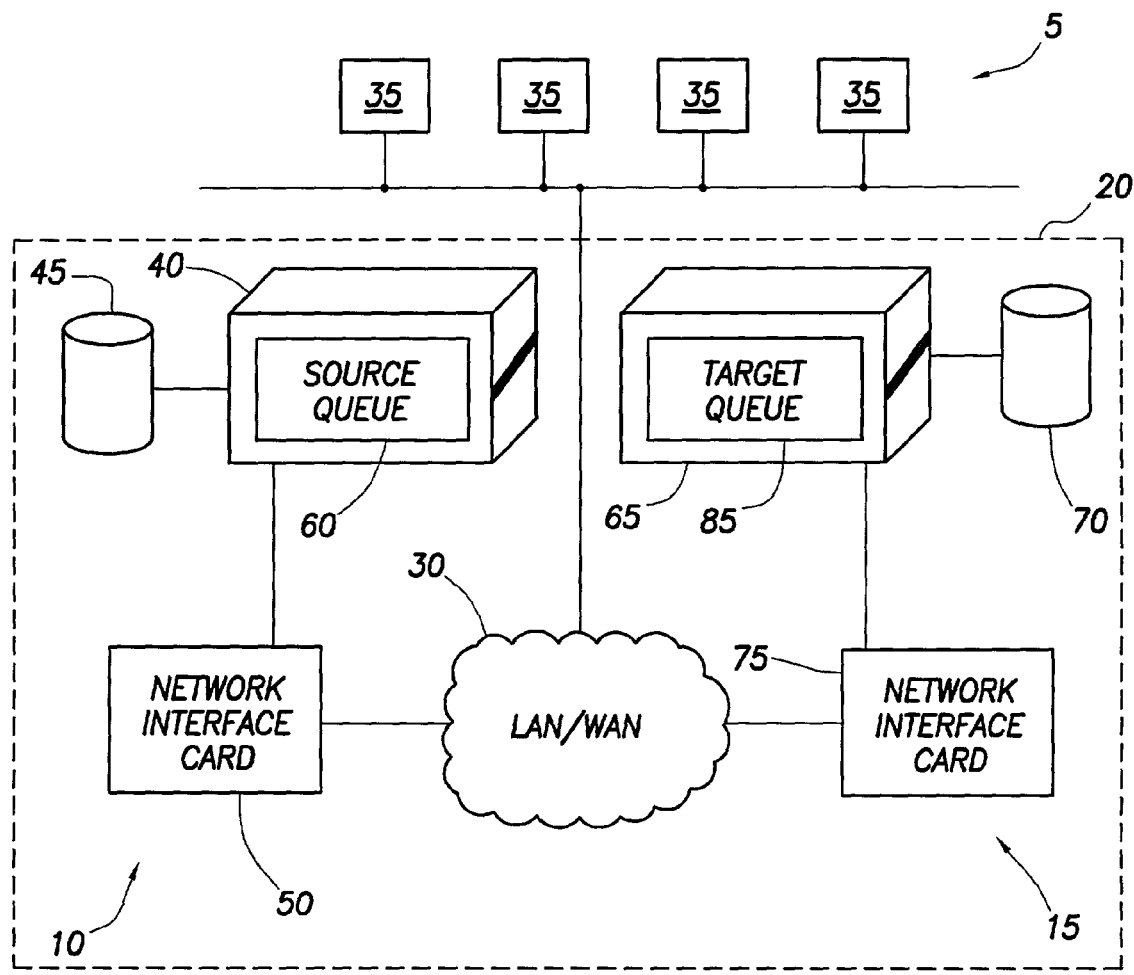
FIG. 1 is a block diagram of an embodiment of a computer network.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present detailed description discloses a system and method for avoiding data discontinuities in stretch cluster server systems. FIG. 1 shows a computer network, which is indicated generally at 5. Computer network 5 includes a source subsystem, which is indicated generally at 10, and a target subsystem, which is generally indicated at 15. A stretch server cluster 20 is formed by source subsystem 10 and target subsystem 15. Source subsystem 10 and target subsystem 15 are communicatively coupled across network 30, which may be a local area network (LAN), wide area network (WAN), or a similar network that allows source subsystem 10 and target subsystem 15 to be geographically distant. One or more clients 35 are served by stretch server cluster 20.

Source subsystem 10 includes a source node 40, storage device 45, network interface card 50. Network interface card 50 provides an interface between source node 40 and network 30. Source queue 60, which resides on source node 40 is a buffer or data structure that allows jobs or operations to be lined up and later executed in a selected order. Similarly, target subsystem includes a target node 65, storage device 70, and network interface card 75.

Figure 2:
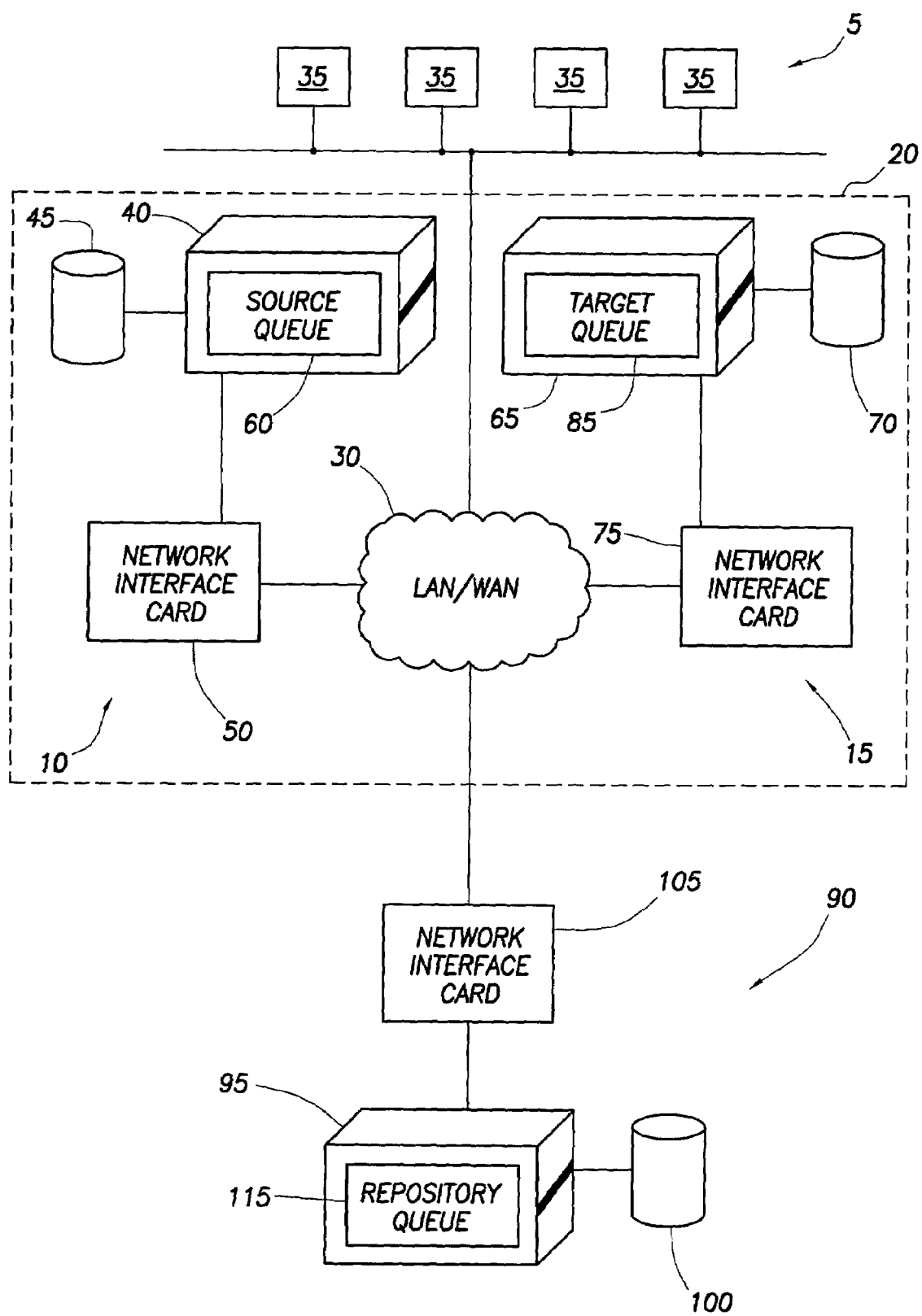
FIG. 2 is a block diagram of an embodiment of a computer network.
Figure 5:
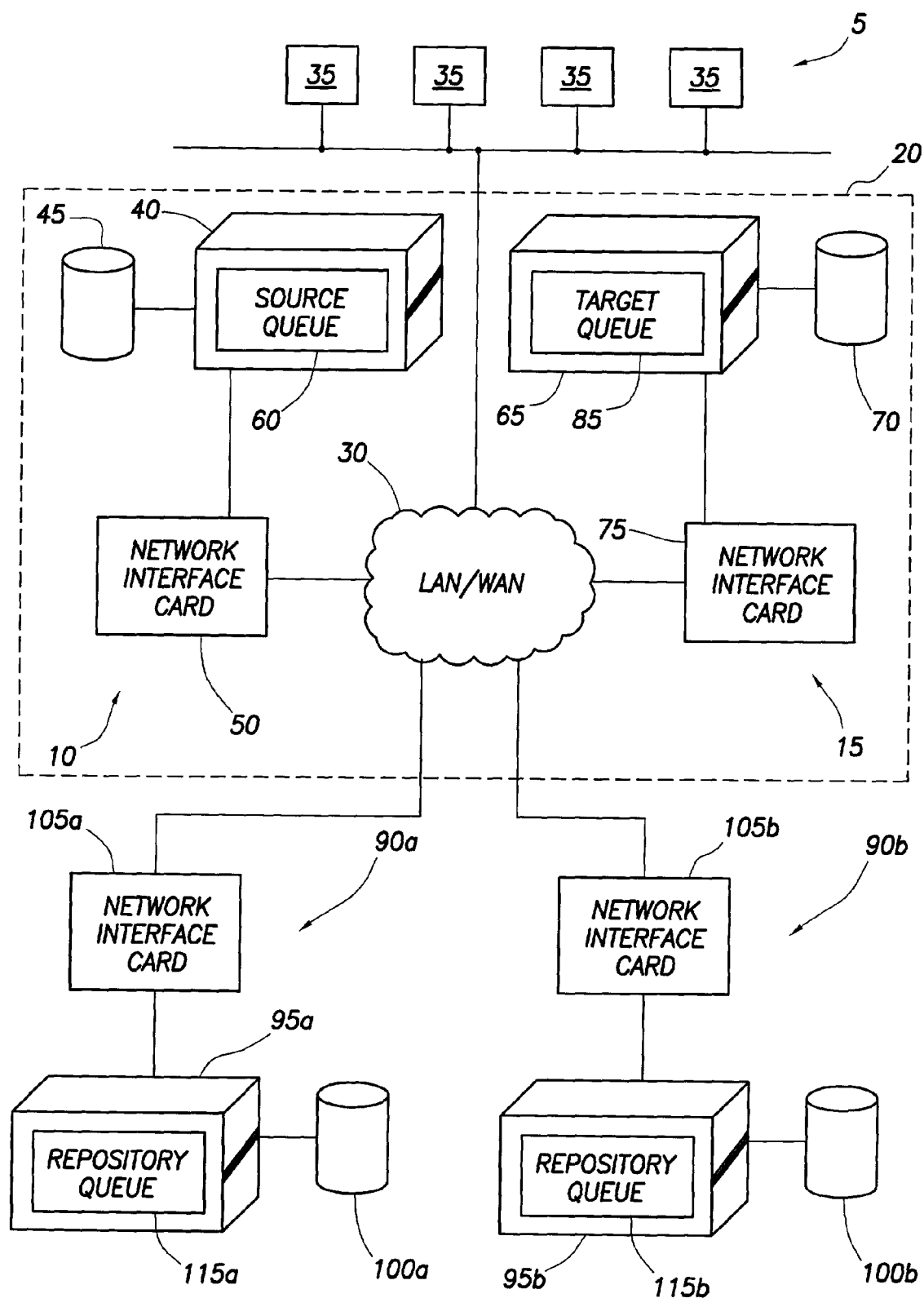
FIG. 5 is a block diagram of an embodiment of a computer network.

FIG. 2 shows a computer network 5 that also contains a repository subsystem, which is generally indicated at 90. Repository subsystem 10 includes a repository node 95, storage device 100 and a network interface card 105. Network interface card 105 provides an interface between repository subsystem 90 and network 30. Accordingly, network interface card 105 provides an interface to repository subsystem 90, source subsystem 10 and target subsystem 15. Repository queue 115, located on repository node 95 is a buffer or data structure that allows jobs or operations to be lined up and later executed in a selected order. Computer system 5 may employ more than one repository subsystem 90, as shown in FIG. 5.

Figure 3:
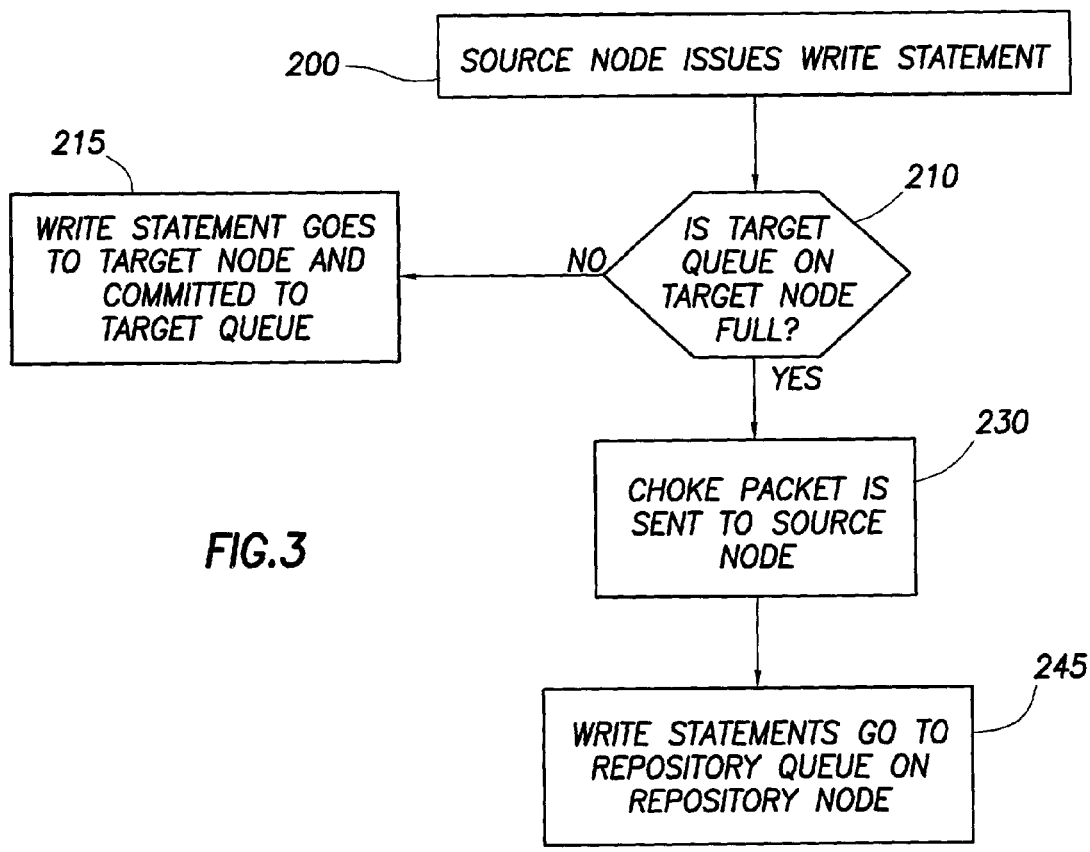
FIG. 3 is a flow chart of a method of handling data replication in a computer system.

When the data stored on stretch server cluster 20 is changed or updated, including any writes to the cluster logs or changes to the meta-data, the write must be performed in a manner that any changes to the data stored at one node are communicated to the second node. As such, the write operation must be logically atomic so that changes cannot be made to one node without making the same set of changes to the second node. Generally, meta-data is information about the data itself. For instance, if a write operation is changing the content of a file, such as adding a paragraph, the data is the added paragraph inserted into the file, whereas the meta-data is the "save" operation that the user performs. FIG. 3 is a flow chart of a method of handling write operations for the computer system 5 shown in FIG. 2. At step 200, the source node 40 issues a write statement to source storage device 45. Because computer system 5 supports a stretch server cluster 20, source node 40 and the target node 65 do not share common storage. As a result, write operations made to the source storage device 45 must be communicated to target storage device 70 across network 30.

At step 210, the cluster software or any other suitable application or agent, determines whether target queue 85 on target node 65 is full and cannot handle the write statement from source node 45. If target queue 85 is not full, then the write statement is sent to target node 65 at step 215. Accordingly, the changes may be made to target storage 70 to mirror the changes made to source storage 45. However, if target queue 8 is full, then the write statement must be queued until target node 65 is able to process the write statement. However, if target queue 85 is full, then the target node 65 sends a choke signal or packet to source node 40.

When source node 40 receives a choke signal from target node 65, the write statement is sent to the repository subsystem 90. Because target queue 85 is full, the cluster software will attempt to queue the write statement in the repository queue 115. In the event that source node 40 or target node 65 fails, the changes that were committed to the storage of the surviving node will be automatically replicated in repository subsystem 90.

As shown in FIG. 5, computer system 5 may employ more than one repository subsystem 90 to improve its fault tolerance. In this case, when source node 40 receives a choke signal from the target node 65, it may send the write statement to repository subsystem 90a and to a second repository subsystem 90b. The contents of repository subsystem 90a will be mirrored in repository subsystem 90b. If repository node 90a fails, the second repository subsystem 90b will still be available for source node 40 to queue the write statement.

Figure 4:
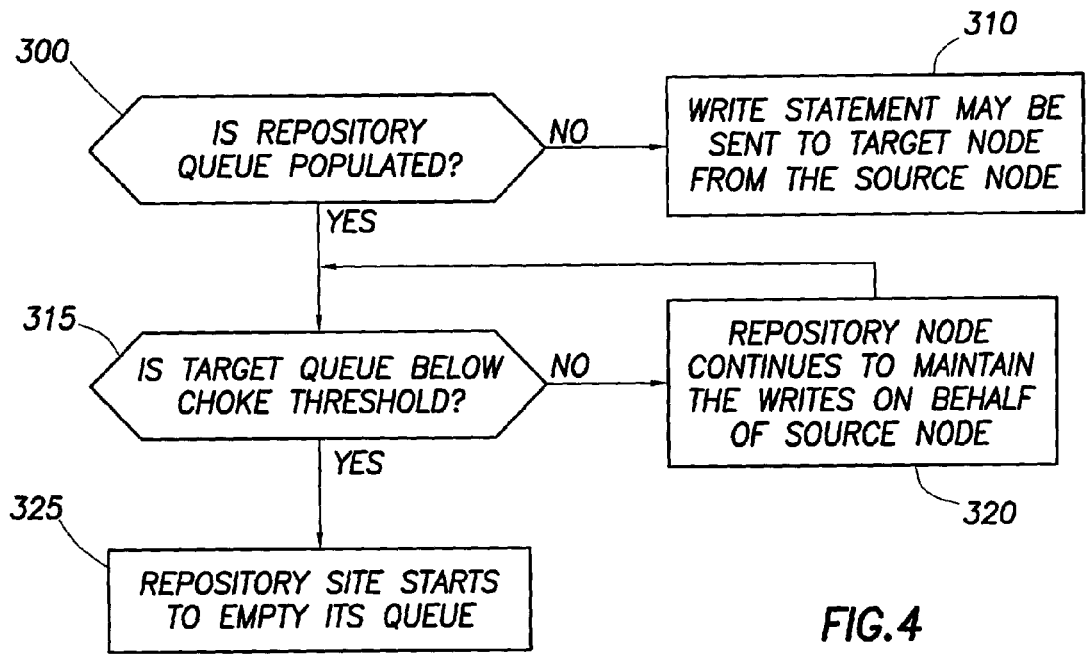
FIG. 4 is a flow chart of a method of handling data replication in a computer system.

FIG. 4 is a flow chart showing a method of updating the meta-data and data of the cluster. At step 300 it is determined whether repository queue 115 is populated with buffered write statements. If the repository queue is empty, then target node 65 may remain available at step 310 and receive write statements from source node 40. However, if the repository queue 115 is populated, then target node 65 should remain unavailable until it can catch up to source node 40. Accordingly, at step 315, source node 40 determines whether the target queue 85 is below the choke threshold. If target queue 85 cannot accept additional write statements, then repository queue 115 is maintained at step 320. Repository queue 115 will be maintained until target queue 85 can accept additional write statements. However, if target queue 85 is not full, then it may begin to accept the backlogged write statements contained in repository queue 115. Therefore, at step 325, repository site 90 begins to empty its queue 115. Repository queue 115 is emptied sequentially to reflect the order in which the write statements were issued by source node 40.

Figure 6:
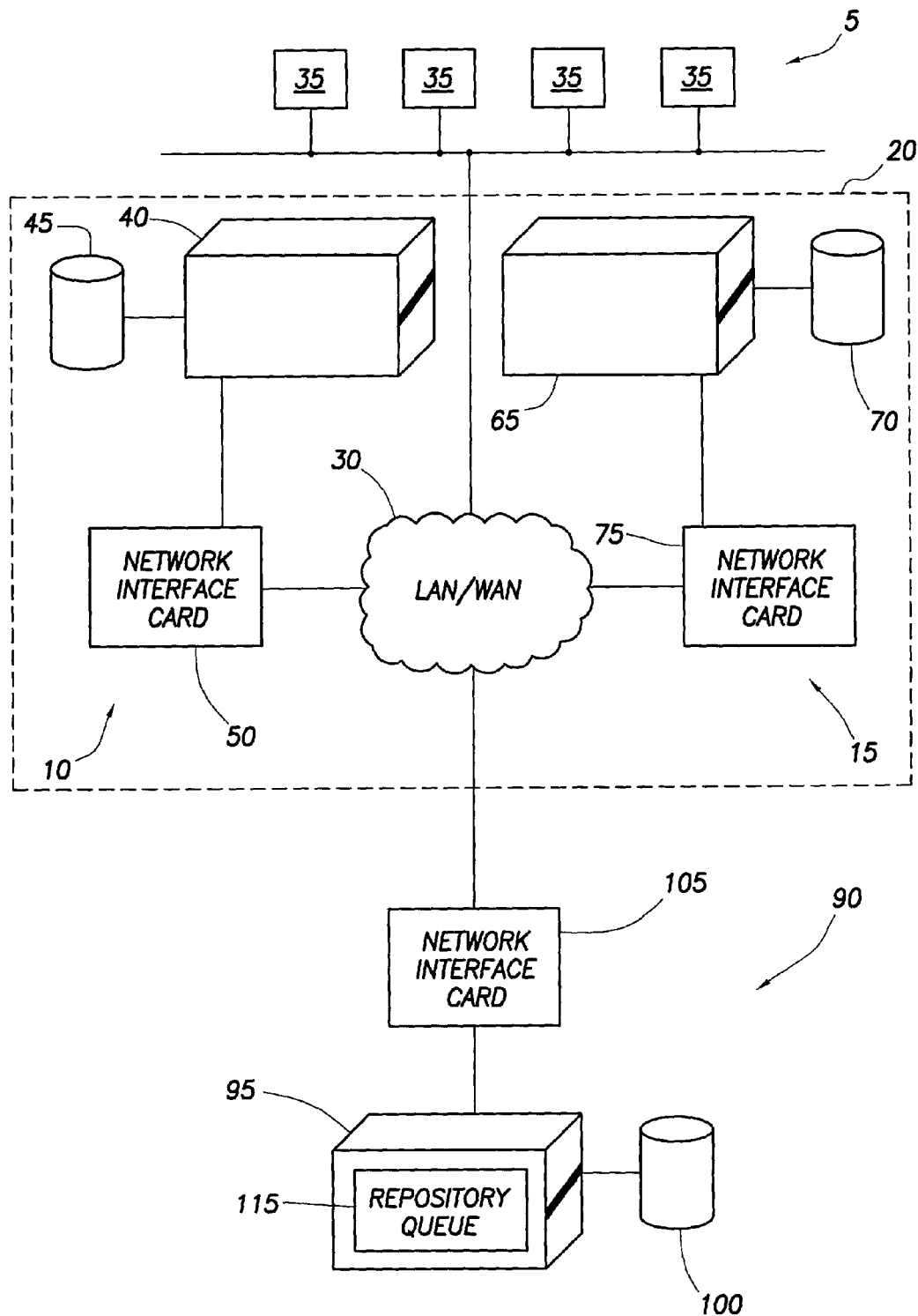
FIG. 6 is a block diagram of an embodiment of a computer network.
Figure 7:
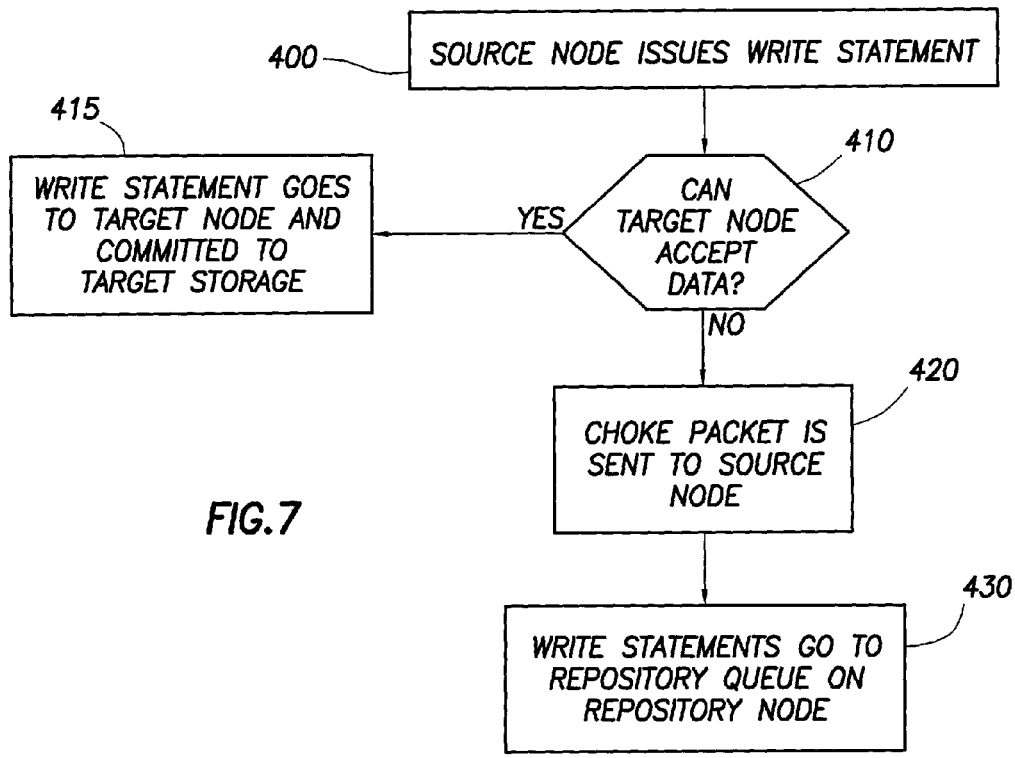
FIG. 7 is a flow chart of a method of handling data replication in a computer system.

Because computer network 5 employs repository subsystem 90, source subsystem 10 and target subsystem 15, it need not include source queue 60 and target queue 85 as shown in FIG. 6. FIG. 7 is a flow chart of a method of handling write operations for the computer system 5 shown in FIG. 6. At step 400, source node 40 issues a write statement. The write statement is sent to target node 65. At step 410, it is determined whether target node 65 can accept the operation. If target node 65 can handle the write statement, then the write statement is sent to target node 65 at step 415. Otherwise, target node 65 sends a choke signal to source node 40 at step 420. Note that in this embodiment, target subsystem 15 does not contain a target queue. When the source node 40 receives the choke signal, source node 40 sends the write statement to the repository subsystem 90 and the write statement is queued in repository queue 115. As discussed above, the computer system 5 depicted in FIG. 6 may implement additional repository subsystems 90 to provide greater fault tolerance.

Figure 8:
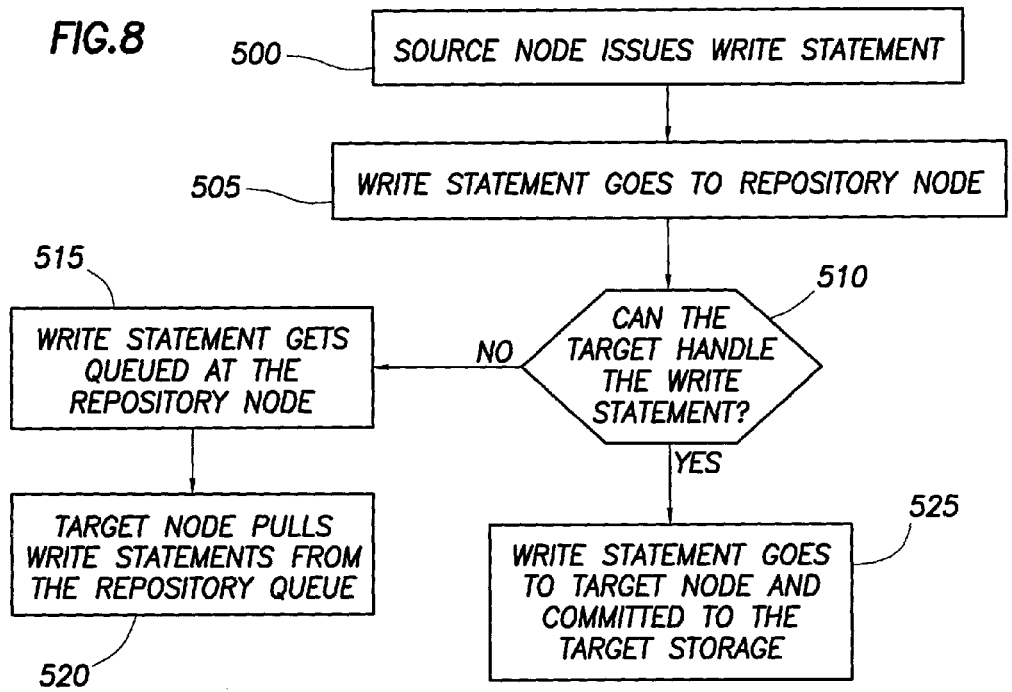
FIG. 8 is a flow chart of a method of handling data replication in a computer system.

FIG. 8 is a flow chart of another method of handling write operations for the computer system 5 shown in FIG. 6. At step 500, the source node 40 issues a write statement. Instead of sending the write statement to target node 65, at step 505 the source node 40 directs the write statement to the repository subsystem 90. At step 510, if the target node 65 is able to accept the write statement, it will be sent and committed to the target storage 70. At step 510 it is determined whether the target node 65 can handle the write statement. If the target system 65 cannot handle the write statement, the write statement will be queued in repository queue 115 at step 515. Next, at step 520, target node 65 pulls the write statement from repository queue 115. The repository queue 115 will then be sequentially emptied as target node 65 draws the write statements from the queue 115.

As shown in FIGS. 1, 2, 5 and 6, due to the nature of stretch clusters, source node 40 and target node 65 do not share common storage. However, data and meta-data must be identical between the two nodes of the stretch cluster. As a result, the data and meta-data must be mirrored or replicated between the two nodes. As discussed above, stretch clusters may employ asynchronous data replication or synchronous data replication. Both types of data replication present both advantages and disadvantages. The following description details a system and method of balancing data integrity with system performance by selectively switching between different types of data transfer.

Figure 9:
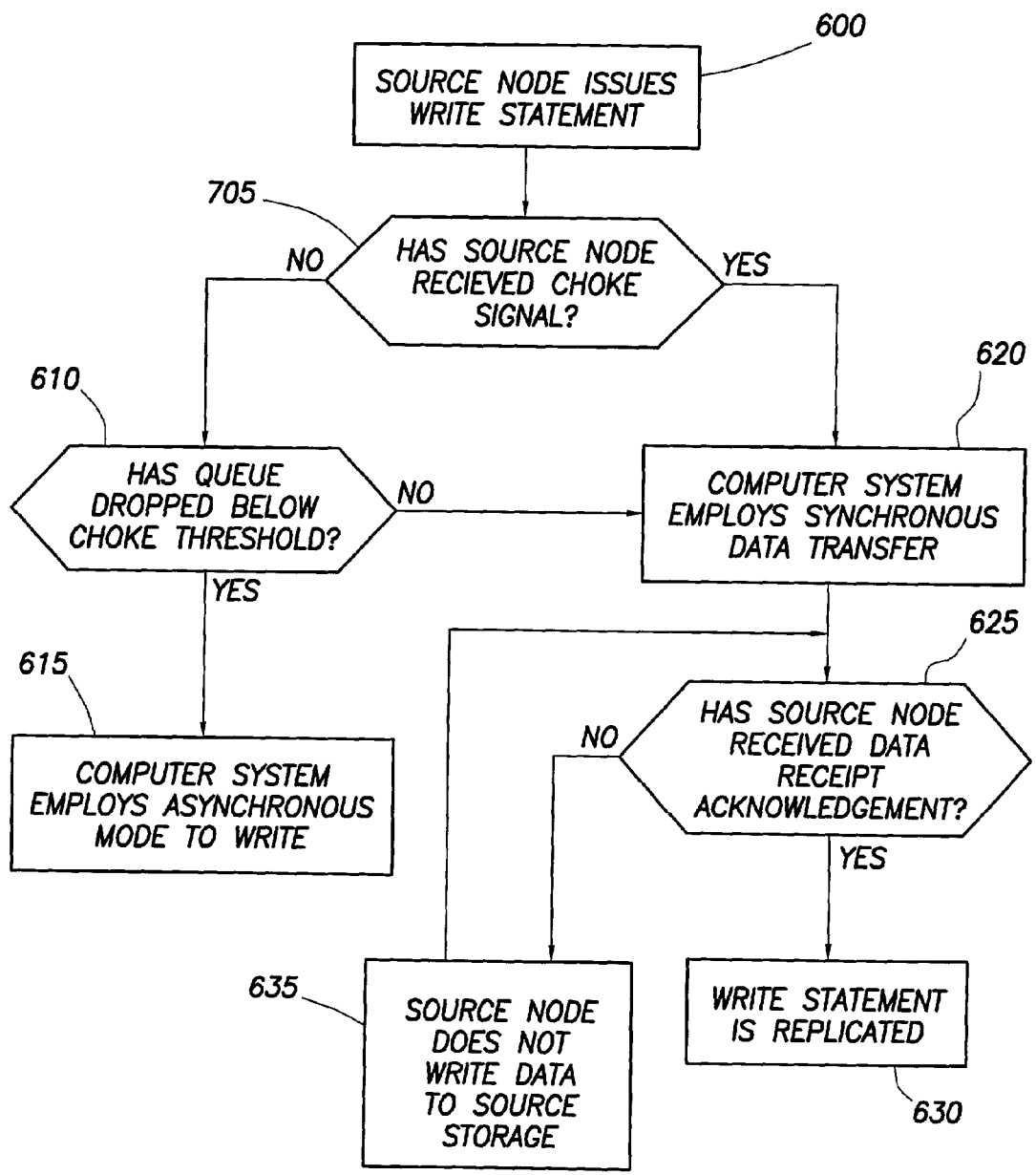
FIG. 9 is a flow chart of a method of selecting between data replication modes in a computer system.

FIG. 9 shows a flow chart of a method of data replication for a computer system 5 such as those shown in FIGS. 1, 2, 5 and 6, for example. For the method shown in FIG. 9, computer system 5 may employ asynchronous data transfer as the default mode to replicate data and meta-data between the nodes. At step 600, source node 40 issues a write statement. As discussed above, the write statement may be directed to target subsystem 15 or repository subsystem 90. At step 605, it is determined whether source node 40 has received a choke signal. Depending on the destination of the write statement, the choke signal may be sent from either target node 65 or repository node 95. If source node 40 did not receive a choke signal, then it must next be determined whether the destination queue is below its choke threshold at step 610. If the destination queue is below its choke threshold then source node 40 and the destination node may proceed to write to their respective storage devices and replicate the data and meta-data at step 615 in asynchronous mode.

However, if source node 40 receives a choke signal, at step 605, or it is determined that the destination queue is currently filling up beyond its choke threshold, at step 610, then computer system 5 switches to synchronous data transfer at step 620 to minimize the risk of data loss. Source node 40 begins to queue data in source queue 60, for the computer system depicted in FIG. 1, or the repository queue 115 for the computer system 5 depicted in FIGS. 2, 5 and 6. Source node 40 also initiates a handshake algorithm requesting data receipt acknowledgement from the destination node. In addition, source node 40 may monitor the destination node and accordingly prevent the client application from accepting client transactions. While preventing the destination node from accepting client transactions may hamper the functions of the site, this action helps ensure that no data is lost.

At step 625, it is determined whether source node 40 has received the data receipt acknowledgement. If source node 40 has not received acknowledgement, then source node 40 does not write the data to source storage 45, as indicated at step 635. Computer system 5 continues using synchronous data transfer. If source node 40 does receive a data receipt acknowledgement, then the destination node has successfully committed the transaction to another storage device. As a result, source node 40 may write the data to source storage 45 and the data is properly mirrored between the two nodes at step 630. The method shown in FIG. 9 may be used in computer systems 5 that use repository subsystems 90, such as those shown in FIGS. 2, 5 and 6, or computer systems 5 that do not use repository subsystems, as shown in FIG. 1.

Figure 10:
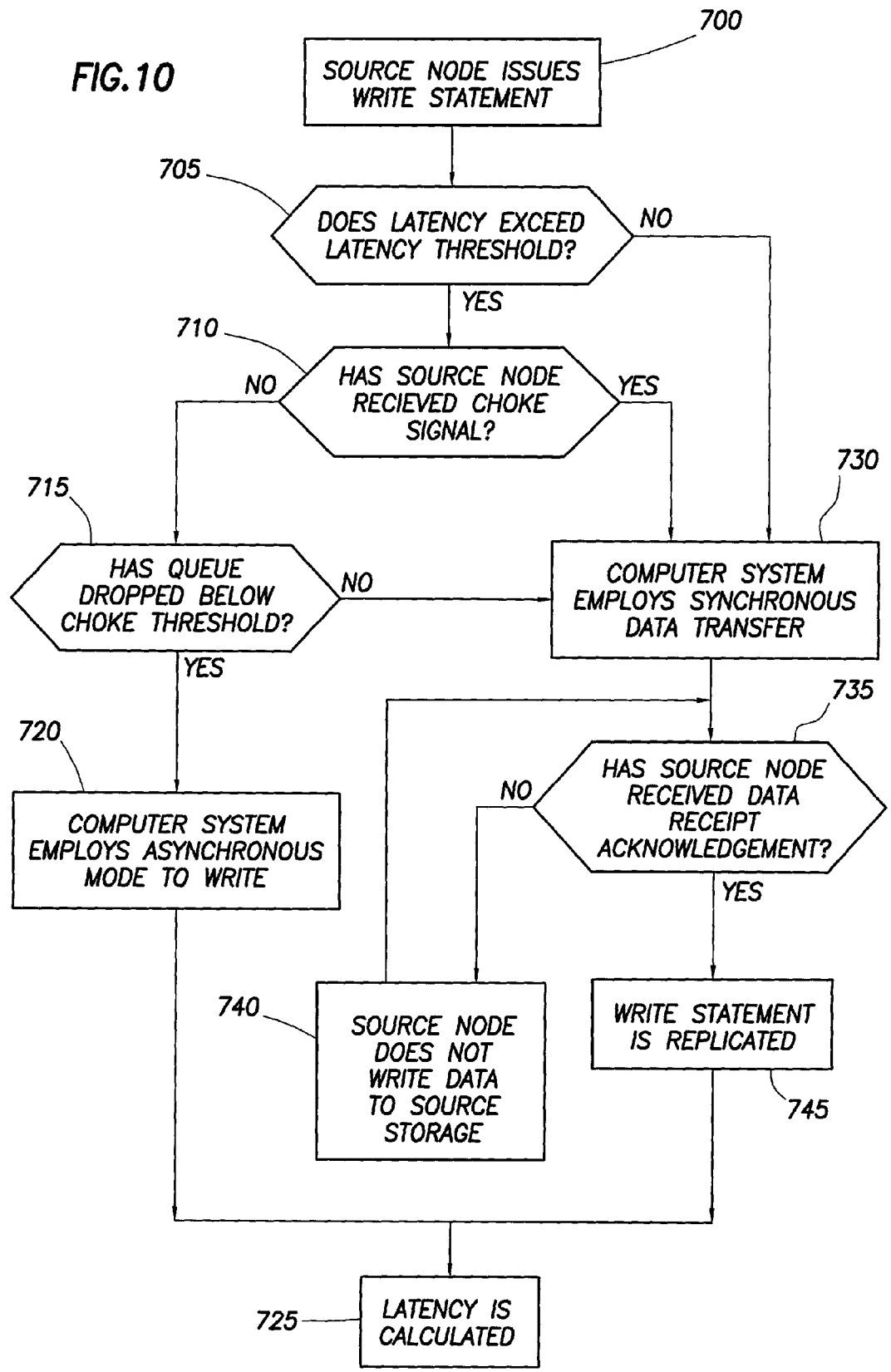
FIG. 10 is a flow chart of a method of selecting between data replication modes in a computer system.

FIG. 10 shows a flow chart of a method of data replication for a computer system 5 such as those shown in FIGS. 1, 2, 5 and 6, for example. For the method shown in FIG. 10, computer system 5 initially utilizes synchronous data transfer as the default mode to replicate data and meta-data between the nodes. At step 700, source node 40 issues a write statement. At step 705 it is determined whether the current latency value exceeds a predetermined latency threshold. The latency value represents the amount of time that elapsed from when the source node 40 issued the write operation to when source node 40 received acknowledgement from the second node. The latency value will increase with network congestion and other factors that will introduce delay in the network. If the latency value remains below the latency threshold, then the speed of the synchronous transfer is acceptable. If the latency value exceeds the latency threshold, then the speed of the synchronous transfer is unacceptable. In this case, it may be desirable to switch to asynchronous data replication.

If the latency value does exceed the threshold value, then it is determined at step 710 whether source node 40 has received a choke signal. If the source node 40 has not received a choke signal, then it is determined whether the destination queue has dropped below the choke threshold at step 715. If the destination queue is below the choke threshold, then computer system 5 may complete its write operation in asynchronous mode at step 720. However, if source node 40 has received a choke signal, or if the destination queue has not dropped below its choke threshold, then computer network 5 will replicate the data in synchronous mode at step 730. Alternatively, if the latency value does exceed the latency threshold then computer system 5 may immediately switch to asynchronous data replication to handle the write statement at step 720, without the safeguard of first determining whether the destination queue is full.

If it is determined at step 705 that the latency value does not exceed the latency threshold, then the speed of synchronous data transfer has not dropped to an unacceptably rate. Accordingly, at step 730, computer network 5 will replicate the data in synchronous mode. Next, at step 735, it is determined whether source node 40 has received the data receipt acknowledgment from the second node. If not, then source node 40 does not write the data to its storage 45, as shown at step 740. If source node 40 does receive acknowledgement, then source node 40 writes to its storage 45. Next, at step 725, the latency value is recalculated.

Although the disclosed embodiments have been described in detail, it should be understood that various changes, substitutions, and alterations can be made to the embodiments without departing from the spirit and the scope of the invention.

What is claimed is:

1. A computer system, comprising:
a source subsystem, wherein the source subsystem is operable to issue a write statement, wherein the source subsystem further comprises,
  a source node operable to issue the write statement; and
  a source storage device operable to store data and meta-data and changes thereto in response to the write statement;
a target subsystem, wherein the source node and the target node are communicatively coupled and wherein the target subsystem is external to the source subsystem;
a repository subsystem,
  wherein the repository subsystem is external to each of the source subsystem and the target subsystem;
  wherein the repository subsystem is communicatively coupled to each of the source subsystem and the target subsystem to facilitate the communication of data between the repository subsystem and the target subsystem and between the repository subsystem and the source subsystem; and
  wherein the repository subsystem is operable to queue the write statement issued by and received from the source subsystem and deliver the write statement to the target subsystem; and
a network, wherein the source subsystem and target subsystem are communicatively coupled across the network.

2. The computer system of claim 1, wherein the target subsystem further comprises:
a target node operable to receive the write statement; and
a target storage device operable to store data and meta-data and changes thereto in response to the write statement.

3. The computer system of claim 2, wherein the data transfer mode is an asynchronous mode.

4. The computer system of claim 3, wherein the repository subsystem further comprises:
a repository node operable to receive and transmit the write statement; and
a repository queue operable to queue the write statement.

5. The computer system of claim 4,
wherein the source node is operable to send the write statement to the repository node;
wherein the repository node is operable to queue the write statement in the repository queue; and
wherein the target node is able to receive the write statement from the repository subsystem.

6. The computer system of claim 4,
wherein the source node is operable to send the write signal to the repository node when the source subsystem is currently unable to replicate the write statement;
wherein the repository node is operable to queue the write statement in the repository queue; and
wherein the target subsystem is able to receive the write statement from the repository subsystem when the target subsystem is able to replicate the write statement.

7. The computer system of claim 6, wherein the source node is operable to send the write statement to the repository subsystem if the source node receives a choke signal from the target subsystem.

8. The computer system of claim 6, wherein the target node is operable to send the choke signal to the source node if the target subsystem is unable to replicate the write statement.

9. The computer system of claim 6, wherein the target subsystem further comprises a target queue associated with a choke threshold and wherein the target subsystem is operable to queue the write statement if the target queue is not above the choke threshold.

10. The computer system of claim 9, wherein the target node is operable to send the choke signal to the source node if the target node is unable to replicate the write statement and the target queue is above the choke threshold.

11. The computer system of claim 6, wherein the repository queue is associated with a choke threshold and is operable to queue the write statement if the repository queue is not above the choke threshold.

12. The computer system of claim 11, wherein the repository node is operable to send a choke signal to the source node if the repository queue is above the choke threshold.

13. The computer system of claim 12, wherein the source subsystem further comprises a source queue.

14. The computer system of claim 13, wherein the source node is operable to queue the write statement in the source queue if it receives a choke signal from the repository node.

15. The computer system of claim 4, further comprising a plurality of repository subsystems.

16. The computer system of claim 15, wherein the content of each repository queue is mirrored in at least one other repository queue.

17. A method of data replication in a computer system, comprising a source subsystem, a target subsystem, and a repository subsystem, wherein the repository subsystem is external to and communicatively coupled to each of the source subsystem and the target subsystem, and wherein the target subsystem is external to the source subsystem, comprising:
issuing a write statement at the source subsystem;
delivering the write statement to the repository subsystem for storage at the repository subsystem for later transmission to the target subsystem, wherein the repository subsystem queues the write statement for later transmission to the target subsystem; and
pulling the write statement from the repository queue when the target subsystem is able to handle the write statement;
replicating the write statement in the target subsystem.

18. The method of claim 17, wherein the write statement is delivered to the repository subsystem if the target subsystem is unable to handle the write statement.

19. The method of claim 18, wherein the target subsystem further comprises a target node operable to receive the write statement.

20. The method of claim 19, wherein the target subsystem is unable to handle the write statement if the target node cannot handle the write statement.

21. The method of claim 19, wherein the target subsystem further comprises a target queue associated with a choke threshold and operable to queue the write statement if the target queue is below the choke threshold.

22. The method of claim 21, wherein the target subsystem is unable to handle the write statement if:
the target node is unable to handle the write statement; and
the target queue is unable to queue the write statement.

* * * * *